Aug. 25, 1931.　　　　F. L. MILLS　　　　1,820,283
ANIMAL BED
Filed Oct. 14, 1929

Inventor
Frank Louis Mills
By Wm. O. Belt
Atty.

Patented Aug. 25, 1931

1,820,283

UNITED STATES PATENT OFFICE

FRANK LOUIS MILLS, OF CHICAGO, ILLINOIS

ANIMAL BED

Application filed October 14, 1929. Serial No. 399,478.

This invention relates to beds for dogs, cats and other small animals and it has for its object to provide a sanitary bed which is strong and substantial but sufficiently yielding to provide a comfortable bed for the animal.

Another object of the invention is to provide a bed comprising a sheet upon which the animal rests and a frame which holds the sheet sufficiently taut to prevent it from being disarranged by the animal by scratching or pawing but adapted to yield sufficiently to conform with the body of the animal and detachably held in place so that it can be easily removed for washing as required.

And a further object of the invention is to provide an animal bed comprising a frame and a sheet and so constructed and arranged that the sheet will be protected from gnawing by the animal and the frame will be shaped to discourage the animal from gnawing it.

Figure 1:
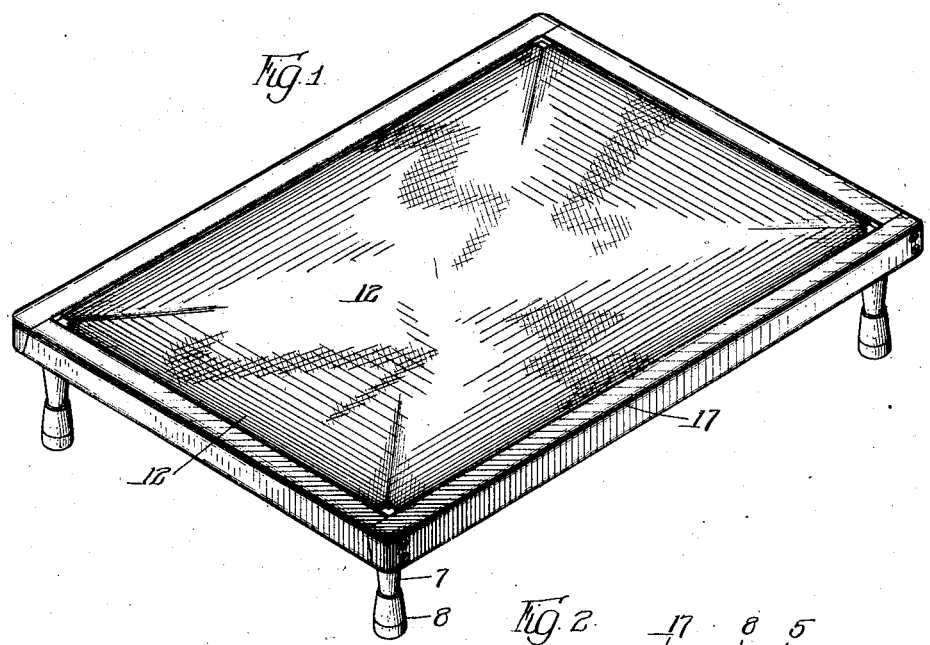
Figure 2:
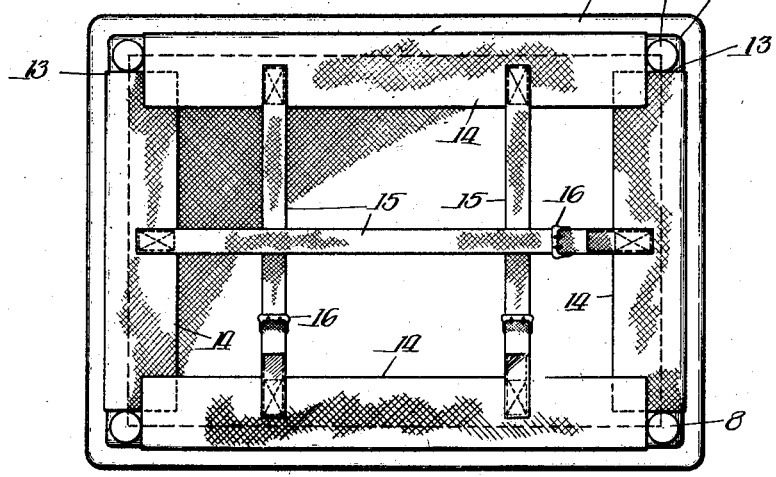
Figure 3:
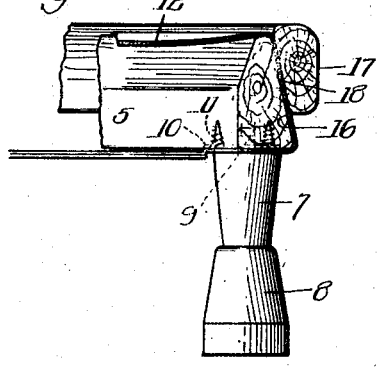
Figure 4:
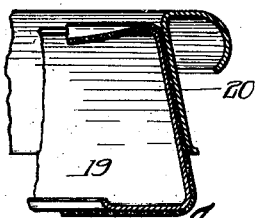

In the accompanying drawings illustrating a selected embodiment of the invention
Fig. 1 is a perspective view of the bed.
Fig. 2 is a bottom plan view.
Fig. 3 is an enlarged detail sectional view.
Fig. 4 shows a modified construction.

Referring to the drawings the invention comprises a rectangular main frame 5 having outwardly beveled outer edges 6. This frame is supported on short legs 7 which preferably have removable rubber caps 8. The legs are provided with studs 9 which screw into plates 10 fastened at the corners of the frame by screws 11. These legs are made removable so that the bed can be compactly packed for storage or transportation. A canvas sheet 12 is arranged on the main frame and this sheet is cut away at 13 at its corners leaving side and end flaps 14 therebetween which extend down the beveled sides and are fastened together over the main frame by straps 15, and buckles 16. A clamping frame 17 of rectangular shape and having inwardly beveled inner sides 18 is adapted to fit on the main frame over the canvas sheet to hold the sheet securely and fixedly on the main frame and to protect the sheet where it is stretched over the upper edge of the main frame from the animals who would otherwise be apt to rub or gnaw the sheet at the edge of the frame. The edges of the clamping frame are also preferably rounded for the same reason because I find that dogs and cats are less liable to rub against or to gnaw or bite a rounded edge than a sharp edge. The frames shown in Figs. 1 to 3 are made of wood but any other material may be substituted. In Fig. 4 I have shown the main frame 19 made of sheet metal with rounded corners, and the clamping frame 20 also made of sheet metal and rounded for the reasons heretofore described.

My invention provides an animal bed of simple construction and comprising but few parts constructed and assembled in a manner which affords practically no crevices or hiding places for vermin to collect. The sheet may be easily removed and washed whenever desired, and the frames may also be washed, so that the bed may always be maintained in sanitary condition. The sheet may be mounted in the frames tightly and as tautly as desired for there will always be some yield to the sheet and if it is not sufficient to conform to the body of the animal and provide a comfortable resting place the clamping frame the tapes may be loosened sufficiently to permit the sheet to yield as desired to the body of the animal after which the clamping frame will be reset to hold the sheet. A dog or a cat will naturally lie in the middle of the sheet, its lowest part, with its head resting on the higher part of the bed in a natural and comfortable position. It is well known that dogs and cats will bite and tear, paw and scratch blankets and other material which are loose or have free edges, but my bed does not present any such edges which are accessible to the animal and therefore it will not be damaged in any way, nor will it be disarranged in the ordinary behavior of such animals in making ready for bed, wherefore the bed will last with ordinary care for a long period of time.

I have shown the invention in a form which I consider desirable for the purpose, but changes in the form, construction and arrangement of parts and in the size and material, may be made to satisfy different conditions and without departing from my invention within the scope of the following claims:

I claim:

1. An animal bed comprising a rectangular main frame, a sheet stretched across said main frame and having side and end flaps extending down the outer sides and under the main frame, said flaps being of a length substantially equal to the length of the sides of the frame over which they are passed whereby restricted openings will be defined in said cover at the corners of said frame, means fastening the flaps together under the main frame, and a clamping frame arranged on the main frame over the flaps.

2. An animal bed comprising a rectangular main frame having outwardly beveled outer sides, a sheet stretched across said main frame, said sheet having its corners cut away forming flaps therebetween and said flaps extending down the beveled sides of the main frame, and a clamping frame having inwardly beveled inner sides and arranged on the main frame over said flaps.

3. An animal bed comprising a rectangular main frame, short legs demountably engaged with said main frame at the corners thereof, a sheet stretched across said main frame, and a clamping frame clamping the sheet between itself and the main frame, said clamping frame having rounded outer edges.

4. An animal bed comprising a rectangular frame having outwardly beveled outer sides, short legs demountably engaged with said frame at the corners thereof, a sheet stretched across the frame and having the corners cut away forming flaps therebetween and said flaps extending around opposite sides of the frame, means underneath the sheet engaging said flaps for securing the sheet on the frame, and a clamping frame embodying rounded outer edges and having inwardly beveled inner sides and arranged on the main frame over said flaps.

FRANK LOUIS MILLS.